United States Patent
Han

(10) Patent No.: US 10,121,414 B2
(45) Date of Patent: Nov. 6, 2018

(54) PIXEL HAVING PLURALITY OF STORAGE CAPACITORS, DISPLAY DEVICE INCLUDING THE PIXEL, AND DRIVING METHOD OF THE DISPLAY DEVICE

(71) Applicant: Samsung Display Co., Ltd., Yongin-si, Gyeonggi-do (KR)

(72) Inventor: Sang-Myeon Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 224 days.

(21) Appl. No.: 14/869,863

(22) Filed: Sep. 29, 2015

(65) Prior Publication Data

US 2016/0019835 A1 Jan. 21, 2016

Related U.S. Application Data

(62) Division of application No. 13/368,138, filed on Feb. 7, 2012, now abandoned.

(30) Foreign Application Priority Data

May 19, 2011 (KR) .................. 10-2011-0047525

(51) Int. Cl.
| | |
|---|---|
| G09G 3/30 | (2006.01) |
| G09G 3/3233 | (2016.01) |
| H04N 13/341 | (2018.01) |
| G09G 3/00 | (2006.01) |
| G09G 3/3208 | (2016.01) |
| G09G 3/3266 | (2016.01) |
| G09G 3/3291 | (2016.01) |

(52) U.S. Cl.
CPC .......... *G09G 3/3233* (2013.01); *G09G 3/003* (2013.01); *G09G 3/3208* (2013.01); *G09G 3/3266* (2013.01); *G09G 3/3291* (2013.01); *H04N 13/341* (2018.05); *G09G 2300/0819* (2013.01); *G09G 2300/0842* (2013.01); *G09G 2300/0852* (2013.01); *G09G 2300/0861* (2013.01); *G09G 2310/0205* (2013.01); *G09G 2320/0252* (2013.01); *G09G 2320/0261* (2013.01)

(58) Field of Classification Search
CPC ..... G09G 2300/0842; G09G 2320/043; G09G 3/3233
USPC .......................... 345/82, 204, 212
See application file for complete search history.

(56) References Cited

U.S. PATENT DOCUMENTS

| | | | |
|---|---|---|---|
| 2002/0018029 A1 | 2/2002 | Koyama | |
| 2010/0238728 A1 | 9/2010 | Leung | |
| 2010/0253670 A1 | 10/2010 | Kimura | |

(Continued)

FOREIGN PATENT DOCUMENTS

| | | |
|---|---|---|
| KR | 2002-0013426 | 2/2002 |
| KR | 10-2006-0065084 | 6/2006 |
| KR | 10-2008-0059937 A | 7/2008 |

(Continued)

*Primary Examiner* — Jonathan Blancha
(74) *Attorney, Agent, or Firm* — Lewis Roca Rothgerber Christie LLP

(57) ABSTRACT

A display device that includes a pixel including an organic light emitting diode (OLED), a driving transistor connected to the driving voltage and supplying a driving current to the OLED, a compensation capacitor connected to the gate electrode of the driving transistor, and a first storage capacitor and a second storage capacitor electrically connected to or blocked from the compensation capacitor, and a driving method thereof.

19 Claims, 10 Drawing Sheets

(56) References Cited

U.S. PATENT DOCUMENTS

2011/0025671 A1   2/2011  Lee

FOREIGN PATENT DOCUMENTS

KR   10-2010-0070857 A   6/2010
KR   10-2011-0013693 A   2/2011

PIXEL HAVING PLURALITY OF STORAGE CAPACITORS, DISPLAY DEVICE INCLUDING THE PIXEL, AND DRIVING METHOD OF THE DISPLAY DEVICE

CROSS-REFERENCE TO RELATED APPLICATION

This application is a divisional of U.S. patent application Ser. No. 13/368,138, filed on Feb. 7, 2012, which claims priority to and the benefit of Korean Patent Application No. 10-2011-0047525, filed in the Korean Intellectual Property Office on May 19, 2011, the entire content of both of which is incorporated herein by reference.

BACKGROUND

1. Field

The following description relates to a pixel, a display device including the same, and a driving method thereof. Particularly, the following description relates to a pixel including an organic light emitting diode (OLED), a display device of an active matrix type including the same, and a driving method thereof.

2. Description of the Related Art

One frame of the active matrix type of display device includes a scan period for programming image data and a light emitting period for emitting light according to the programmed image data. However, as the size of the display panel and the resolution thereof is increased, the Resistive-Capacitive (RC) delay of the display panel is increased. Thus, the time for programming the image data to each pixel of the display panel is increased such that it is difficult to drive the display device.

Also, when the display device displays a stereoscopic image, this problem may be more severe.

When the display device displays the stereoscopic image according to a National Television System Committee (NTSC) method, the display device must alternately display left eye pictures of 60 frames and right eye pictures of 60 frames during one second. Accordingly, the driving frequency of the display device to display the stereoscopic image must be at least twice compared with the display device displaying a plane image.

In the case of displaying the stereoscopic image, data writing must be completed within at least 1/120 of a second, and therefore a driver operating with a high driving frequency to scan the entire display panel during the scan period and to program the image data is required. The driver of the high driving frequency increases production cost.

The above information disclosed in this Background section is only for enhancement of understanding of the background of the invention and therefore it may contain information that does not form the prior art that is already known in this country to a person of ordinary skill in the art.

SUMMARY

Aspects of embodiments of the present invention are directed toward a pixel suitable for a large-sized and high resolution display device and that displays a stereoscopic image, a display device including the same, and a driving method thereof.

A display device according to an embodiment of the present invention includes a plurality of pixels including an organic light emitting diode (OLED), a driving transistor connected to a driving voltage and supplying a driving current to the organic light emitting diode (OLED), a compensation capacitor connected to the gate electrode of the driving transistor, a first storage capacitor electrically connected to or disconnected from the compensation capacitor, and a second storage capacitor. A driving method of the display device includes: a reset step in which an anode voltage of the organic light emitting diode (OLED) is discharged; a compensation step in which a threshold voltage of the driving transistor is stored to the compensation capacitor; a scan step in which the data voltage is stored to the first storage capacitor according to the corresponding data signal; and a light emitting step in which the organic light emitting diode (OLED) emits light according to the driving current flowing to the driving transistor by the data voltage stored to the second storage capacitor, wherein the light emitting steps of the plurality of pixels are concurrently or simultaneously generated, and the scan step and the light emitting step are temporally overlapped.

In one embodiment, the scan step includes a step in which the connection of the first storage capacitor and the compensation capacitor is blocked, and the first storage capacitor is transmitted with the corresponding data signal.

In one embodiment, the light emitting step includes a step in which the second storage capacitor and the compensation capacitor are connected, and the voltage of the gate electrode of the driving transistor is changed by the data voltage stored in the second storage capacitor.

In one embodiment, the reset step includes a step in which the driving transistor is turned on such that the anode of the organic light emitting diode (OLED) is connected to the driving voltage, and a different driving voltage input to a cathode of the organic light emitting diode (OLED) is higher than the driving voltage.

In one embodiment, the compensation step includes a step in which the first storage capacitor is connected to the compensation capacitor, a set or predetermined voltage is input to a node at which the first storage capacitor and the compensation capacitor are connected, and the driving transistor is diode-connected.

In one embodiment, the reset step includes a step in which the first storage capacitor and the compensation capacitor are connected, a set or predetermined reference voltage is transmitted to the voltage of the node at which the first storage capacitor and the compensation capacitor are connected, and the voltage of the gate electrode of the driving transistor is initialized by the reference voltage. In one embodiment, the reference voltage is at a level that turns on the driving transistor.

In one embodiment, the display device further includes another driving voltage connected to the cathode of the organic light emitting diode (OLED), and a voltage level of the other driving voltage during the reset step and compensation step is different than that during the light emitting period.

A display device according to an embodiment of the present invention includes a plurality of pixels each including a driving transistor, a first storage capacitor, and a second storage capacitor. A driving method of the display device includes: programming first frame data to the first storage capacitor of each of the plurality of pixels during a first scan period; programming second frame data to the second storage capacitor of each of the plurality of pixels during a second scan period; and emitting light through the plurality of pixels by a driving current flowing in the driving transistor of each of the plurality of pixels according to the first frame data programmed to the first storage capacitor during a first light emitting period, wherein the second scan period and the first light emitting period are temporally overlapped.

In one embodiment, the driving method of the display device further includes a step in which the third frame data preceding the first frame is programmed to the second storage capacitor of each of the plurality of pixels, and the plurality of pixels emit light during a second light emitting period by a driving current flowing in the driving transistor of each of the plurality of pixels according to the third frame data programmed to the second storage capacitor of each of the plurality of pixels, and the second light emitting period and the first scan period are temporally overlapped.

In one embodiment, the first frame data is first view point data, and the second frame data is second view point data different from the first view point.

A pixel of a display device according to an embodiment of the present invention includes: an organic light emitting diode (OLED); a driving transistor electrically connected to a first driving voltage and supplying a driving current to the organic light emitting diode (OLED); a compensation capacitor including one electrode connected to the gate electrode of the driving transistor; a first operation control transistor including one electrode connected to the other electrode of the compensation capacitor and controlled by the first operation control signal; a second operation control transistor including one electrode connected to the other electrode of the compensation capacitor and controlled by the second operation control signal; a first storage capacitor including one electrode connected to the other electrode of the first operation control transistor; and a second storage capacitor including one electrode connected to the other electrode of the second operation control transistor, wherein the second operation control transistor is turned on such that the second storage capacitor and the compensation capacitor are connected during a period in which the first operation control transistor is turned off such that the data voltage is stored to the first storage capacitor according to the corresponding data signal.

In one embodiment, the pixel further includes a first switching transistor including one electrode connected to the one electrode of the first storage capacitor and the other electrode input with the corresponding data signal and controlled by the first scan signal, and a second switching transistor including one electrode connected to one electrode of the second storage capacitor and the other electrode input with the corresponding data signal and controlled by the second scan signal.

In one embodiment, the pixel further includes a compensation transistor connected between the gate electrode and the drain electrode of the driving transistor.

In one embodiment, the first switching transistor is turned on and the compensation transistor is turned on during a compensation period.

In one embodiment, the first storage capacitor includes the other electrode connected to the first driving voltage, and the second storage capacitor includes the other electrode connected to the first driving voltage.

In one embodiment, the first storage capacitor includes the other electrode connected to a set or predetermined reference voltage different from the first driving voltage, and the second storage capacitor includes the other electrode connected to the reference voltage.

In one embodiment, the first driving voltage includes a second driving voltage and a third driving voltage, the second driving voltage and the third driving voltage have the same waveform, and the pixel further includes a first light emitting transistor connected between the second driving voltage and the driving transistor, and a second light emitting transistor connected between the third driving voltage and the driving transistor.

In one embodiment, the pixel further includes a source of a fourth driving voltage applied to a cathode of the organic light emitting diode (OLED), and the driving transistor is turned on during a reset period and the first driving voltage has a lower level than the fourth driving voltage.

A display device according to an embodiment of the present invention includes: a plurality of data lines transmitting a plurality of data signals; a plurality of first scan lines transmitting a plurality of first scan signals; a plurality of second scan lines transmitting a plurality of second scan signals; a first operation control line and a second operation control line transmitting a first operation control signal and a second operation control signal; a first voltage line transmitting a first driving voltage and a second voltage line transmitting a second driving voltage; and a plurality of pixels each connected to the corresponding data line, the corresponding first scan line, the corresponding second scan line, the first operation control line, the second operation control line, the first voltage line, and the second voltage line, wherein the pixel includes an organic light emitting diode (OLED) including a cathode connected to the second voltage line, a driving transistor connected to the first voltage line supplying a driving current to the organic light emitting diode (OLED), a compensation capacitor connected to a gate electrode of the driving transistor, a first storage capacitor and a second storage capacitor connected between the compensation capacitor and a source of the driving voltage, and wherein the display device is configured to provide: a first period in which the first storage capacitor is connected to the corresponding data line according to both the first scan signal transmitted through the corresponding first scan line and the first operation control signal transmitted through the first operation control line, and the compensation capacitor is blocked; and a second period temporally overlapped with the first period and in which the second storage capacitor is blocked from the corresponding data line and is connected to the compensation capacitor according to both a second scan signal transmitted through the corresponding second scan line and the second operation control signal transmitted through the second operation control line.

In one embodiment, the display device further includes a compensation control line transmitting a compensation signal, and the pixel further includes a compensation transistor connected between the gate electrode and the drain electrode of the driving transistor and operated according to the compensation signal.

In one embodiment, during a reset period in which the compensation transistor is turned on and the first driving voltage transmitted through the first voltage line is at a first level, the display device is configured to provide the second driving voltage level transmitted through the second voltage line that is different from the level of the second driving voltage during the first period and the second period. In one embodiment, the first driving voltage is at a second level different from the first level during the first period and the second period.

Embodiments of the present invention provide a pixel suitable for a large size and high resolution display device that can display a stereoscopic image, a display device including the same, and a driving method thereof.

DETAILED DESCRIPTION

Figure 1:
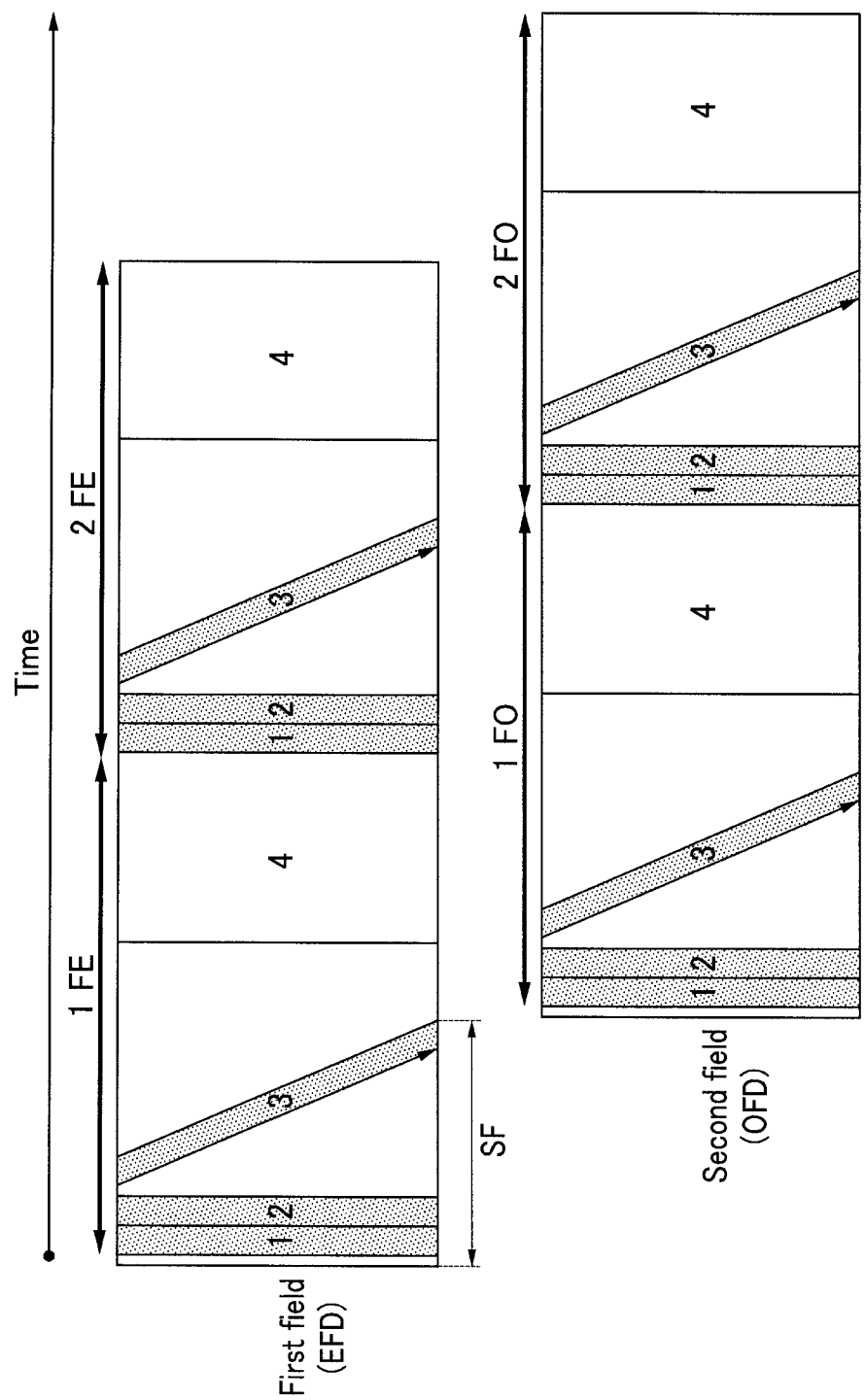
FIG. 1 is a view showing a case of driving all pixels of a display unit divided into two groups.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "indirectly or electrically coupled" to the other element through one or more third elements. In addition, unless explicitly described to the contrary, the word "comprise" and variations such as "comprises" or "comprising" will be understood to imply the inclusion of stated elements, but not the exclusion of any other elements.

A display device according to an exemplary embodiment of the present invention is operated by a concurrent or simultaneous light emitting method. The concurrent or simultaneous light emitting method is a method in which a plurality of pixels that are light-emitted during a corresponding frame, concurrently or simultaneously emit light such that an image of one frame displayed by the display device is concurrently or simultaneously displayed.

For concurrent or simultaneous light emitting by all pixels during the light emitting period, data writing must be completed for all pixels before the light emitting period. If the period of one frame is divided into a scan period for programming the data to all pixels and the light emitting period, the scan period may be less than half of one frame period. Also, the light emitting period may be less than half of one frame period.

To sufficiently obtain the light emitting period and the scan period, all pixels of the display device are divided into two groups, and two groups may be alternatively operated with the scan period or the light emitting period.

FIG. 1 is a view showing a case of driving all pixels of a display unit divided into two groups.

A plurality of pixels of the display unit are divided into a plurality of first group pixels emitting light during a first field and a plurality of second group pixels emitting light during a second field. The first field and the second field are display periods including at least one frame, and one frame may sequentially include a reset period 1, a compensation period 2, a scan period 3, and a light emitting period 4.

The reset period 1 is a period for resetting an anode voltage of an organic light emitting diode (OLED) by a discharge, and compensating a threshold voltage of the driving transistor of the pixel of the compensation period 2.

Also, the first field EFD and the second field OFD are driven in synchronization with a time that is moved by a set or predetermined period SF. In detail, one frame 1FO of the second field temporally close to one frame 1FE of the first field EFD is temporally shifted by a period SF from the start of the one frame 1FE. The period SF is set up to not overlap the scan period 3. One frame 2FE of the first field is continuous after the frame 1FE, and one frame 2FO of the second field is continuous after the frame 1FO.

During the period 4 in which the first group pixels emit light, the scan period 3 in which the data signal respectively corresponding to the second group pixels is programmed. Likewise, during the period 4 in which the second group pixels emit the light, the scan period 3 in which the data signal respectively corresponding to the second group pixels is programmed, is generated. Accordingly, the scan period 3 may be sufficiently obtained such that a temporal margin to drive the display panel is increased. Also, the scan frequency may be decreased such that the bandwidths of both a data driver generating and transmitting a data signal to a data line, and a scan driver generating the scan signal, are decreased, and resultantly the cost of circuit parts may be reduced.

As described above, when the pixels are divided into two groups and the field in which each group emits light is divided and operated, the display device may be manufactured with a large size and high resolution. Also, the display device is driven according to the concurrent or simultaneous light emitting such that a motion blur may be reduced compared with the conventional art of sequentially emitting the light according to the scan lines. In addition, when two groups respectively display the image of a set or predetermined view point, the display device displays a screen of different view points for two groups such that a stereoscopic image display is possible.

However, to divide a plurality of pixels into two groups, a driving voltage must be divided and supplied to two groups, and a wire supplying the driving voltage must be separated. Also, the pixel circuit structure and wire structure may be complicated according to the arrangement of the first group pixels and the second group pixels. That is, the panel design may be complicated.

The data representing the image must also be mapped according to the arrangement of the first group pixels and the second group pixels such that the constitution and operation of a controller mapping the data may be complicated.

In addition, since a time difference of the light emitting exists between the first group pixels and the second group pixels, when a pattern is moved with a set or predetermined speed, the shape and arrangement in the panel of the first group pixels and the second group pixels may be recognized as a pattern. This is referred to as a motion artifact.

Figure 2:
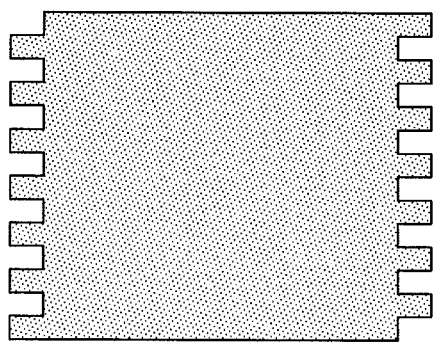
FIG. 2 is a view of a motion artifact that may be generated in a display device.

FIG. 2 is a view of a motion artifact that may be generated in a display device. FIG. 2 shows the motion artifact that may be generated when the first group pixels and the second group pixels are formed per pixel row.

As shown in FIG. 2, the arrangement of the first group pixels and the second group pixels is recognized. Thus, as shown in FIG. 2, the motion artifact in which the block edges of each group appear to be missing according to the arrangement of two groups may be generated.

Embodiments of the present invention provide a display device in which the operation of the light emitting period and the operation of the scan period are executed for a plurality of pixels, as a display device driven by the concurrent or simultaneous light emitting method. Thus, the scan period and the light emitting period may be sufficiently obtained, and the above-described drawbacks such as the motion artifact generated in the display device in which the pixels are not divided into two groups may be reduced or prevented.

In addition, the scan and light emitting are executed together for each pixel such that the display device of an embodiment of the present invention may extend the data writing period and the light emitting period.

Next, an exemplary embodiment of the present invention will be described with reference to FIG. 3.

Figure 3:
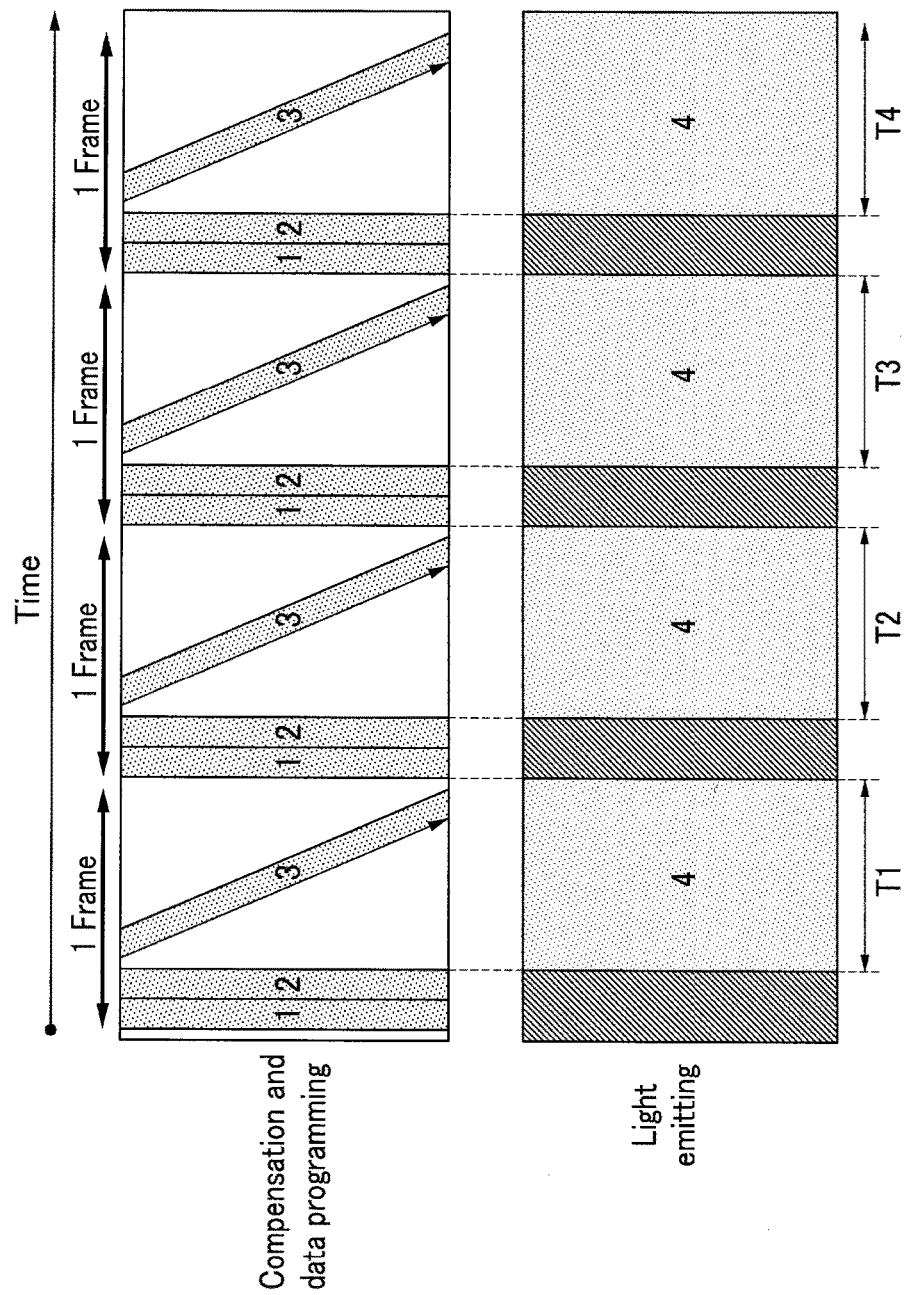
FIG. 3 is a view showing a driving method of a display device according to an exemplary embodiment of the present invention.

FIG. 3 shows a driving method of a display device according to an exemplary embodiment of the present invention.

As shown in FIG. 3, one frame includes the reset period 1, the compensation period 2, the scan period 3, and the light emitting period 4. The scan period 3 and the light emitting period 4 are generated to be temporally overlapped.

The pixel emits light at the light emitting period 4 of the current frame according to the data programmed at the scan period 3 of the previous frame, and the pixel emits light at the light emitting period 4 of the next frame according to the data programmed to the pixel at the scan period 3 of the current frame.

The period T1 includes the scan period 3 and the light emitting period 4 of the N-th frame. Accordingly, the data programmed to the pixels at the scan period 3 of the period T1 is the data of the N-th frame, and the pixels emit light according to the data of the N-th frame programmed at the scan period 3 of the (N−1)-th frame at the light emitting period 4 of the period T1.

The period T2 includes the scan period 3 and the light emitting period 4 of the (N−1)-th frame. Accordingly, the data programmed to the pixels at the scan period 3 of the period T2 is the data of the (N+1)-th frame, and the pixels at the light emitting period 4 of the period T2 emit the light according to the data of the N-th frame programmed at the scan period 3 (that is, the period T1) of the N-th frame.

In the scan period 3 of the periods T3 and T4, the data of the (N+2)-th frame and the data of the (N+3)-th frame are programmed to the pixels, and in the light emitting period 4 of the periods T3 and T4, the pixels emit light according to both the data programmed at the scan period 3 of the (N−1)-th frame and the data programmed at the scan period 3 of the (N+2)-th frame.

A structure of the pixel in which (1) the data of the current frame is programmed during the scan period 3 and (2) the pixel is emitting light according to the data of the previous frame and during the light emitting period 4 that is temporally overlapped with the scan period 3 will be described with reference to FIG. 4 and FIG. 5.

Figure 4:
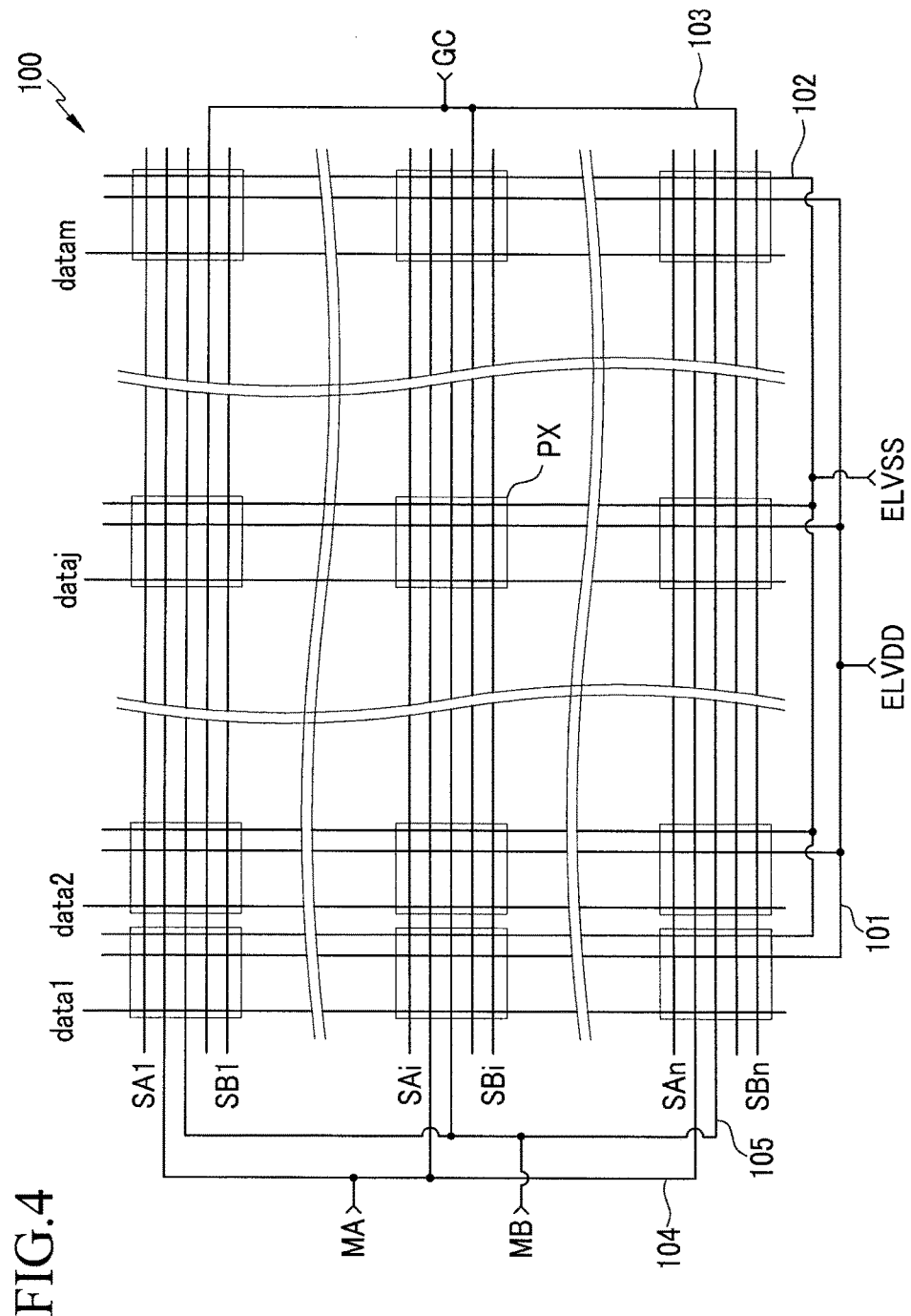
FIG. 4 is a view showing a display unit of a display device according to an exemplary embodiment of the present invention.

FIG. 4 is a view of a display unit 100 of a display device according to an exemplary embodiment of the present invention.

As shown in FIG. 4, the display unit 100 includes a plurality of first scan lines SA1-SAn, a plurality of second scan lines SB1-SBn, a plurality of data lines data1-datam, a first voltage line 101, a second voltage line 102, a compensation control line 103, a first operation control line 104, and a second operation control line 105.

The plurality of first scan lines SA1-SAn respectively extend in a transverse direction, and are respectively connected to a plurality of pixels PX of one row. The plurality of second scan lines SB1-SBn respectively extend in the transverse direction, and are respectively connected to a plurality of pixels PX of one row.

The plurality of data lines data1-datam extend in a longitudinal direction, and intersect or cross the transverse direction of the plurality of first scan lines SA1-SAn and the plurality of second scan lines SB1-SBn. The plurality of data lines data1-datam are each connected to a plurality of pixels PX of one column.

The first voltage line 101 is a wire for transmitting a driving voltage ELVDD to a plurality of pixels PX. The first voltage line 101 may be connected to a plurality of pixels PX. In FIG. 4, as one example, the first voltage line 101 is formed with a plurality of wires formed in the longitudinal direction and with one connection wire connecting them.

The second voltage line 102 is a wire for transmitting a driving voltage ELVSS to a plurality of pixels PX. The second voltage line 102 may be also connected to a plurality of pixels PX. In FIG. 4, as one example, the second voltage line 101 includes a plurality of wires formed in the longitudinal direction and one connection wire connecting them.

The compensation control line 103 is a wire for transmitting a compensation control signal GC to a plurality of pixels PX. The compensation control line 103 may also be connected to a plurality of pixels PX. In FIG. 4, as one example, the compensation control line 103 includes a plurality of wires formed in the transverse direction and one connection wire connecting them.

The first operation control line 104 is a wire for transmitting the first operation control signal MA to a plurality of pixels PX. The first operation control line 104 may be connected to a plurality of pixels PX. In FIG. 4, as one example, the first operation control line 104 includes a plurality of wires formed in the transverse direction and one connection wire connecting them.

The second operation control line 105 is a wire for transmitting the second operation control signal MB to a plurality of pixels PX. The second operation control line 105 may be connected to a plurality of pixels PX. In FIG. 4, as one example, the second operation control line 105 includes a plurality of wires formed in the transverse direction and one connection wire connecting them.

A plurality of pixels PX are respectively connected to a corresponding data line of a plurality of data lines, a corresponding first scan line of a plurality of first scan lines, a corresponding second scan line of a plurality of second scan lines, two driving voltage lines, the compensation control line, the first operation control line, and the second operation control line.

Next, the pixel structure will be described with reference to FIG. 5.

Figure 5:
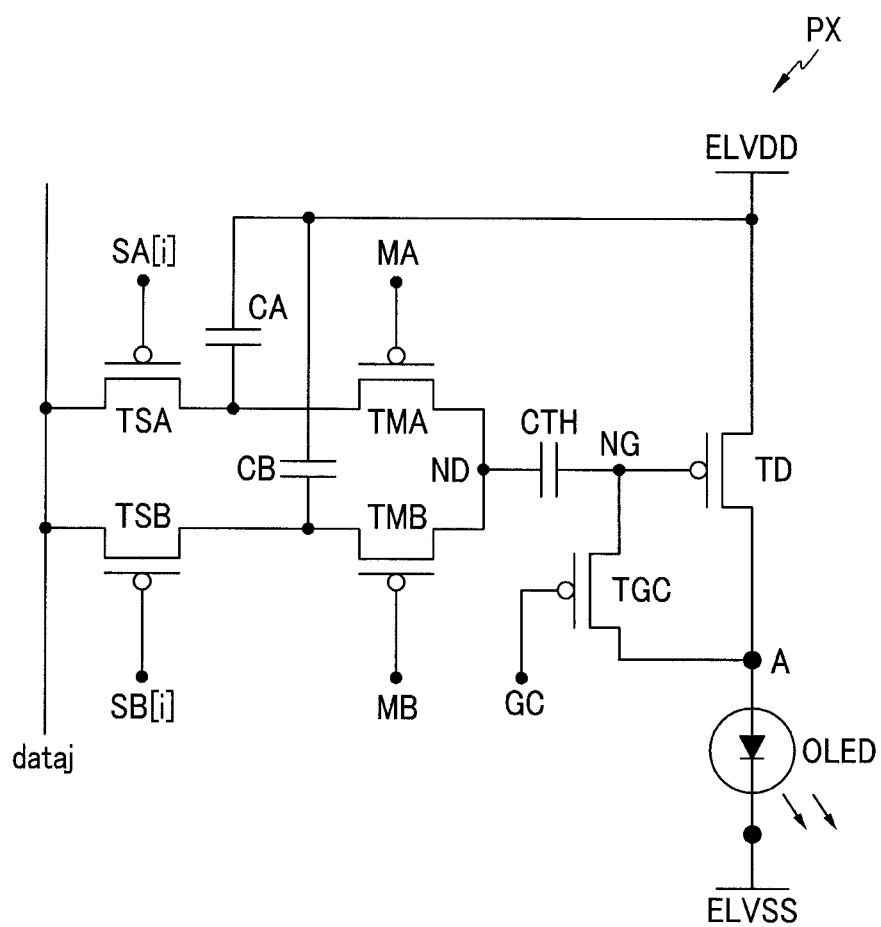
FIG. 5 is a view of a pixel structure according to an exemplary embodiment of the present invention.

FIG. 5 is a view of a pixel structure according to an exemplary embodiment of the present invention. The pixel PX shown in FIG. 5 is a pixel connected to the first scan line SAi, the second scan line SBi, and the data line dataj. The other pixels are the same as the pixel shown in FIG. 5.

As shown in FIG. 5, the pixel includes six transistors TD, TSA, TSB, TMA, TMB, and TGC, two storage capacitors CA and CB, a compensation capacitor CTH, and an organic light emitting diode (OLED).

The driving voltage ELVDD and the driving voltage ELVSS for operating the pixel are supplied to both terminals to which the driving transistor TD and the organic light emitting diode (OLED) are connected in series.

The six transistors TD, TSA, TSB, TMA, TMB, and TGC shown in FIG. 5 are P-channel-type transistors. However, the present invention is not limited thereto, and the channel type of each transistor is determined according to the signal level input to the gate electrode of each transistor and the operation state of each transistor according to the signal level.

The driving transistor TD includes the source electrode connected to the driving voltage ELVDD, the drain electrode connected to the anode of the organic light emitting diode (OLED), and the gate electrode connected to the compensation capacitor CTH.

The compensation transistor TGC includes both electrodes respectively connected to the gate electrode and the drain electrode of the driving transistor TD, and the gate electrode input with the compensation control signal GC. The compensation transistor TGC diode-connects the driving transistor TD of the compensation period 2.

The compensation capacitor CTH includes one electrode connected to the gate electrode of the driving transistor TD, and the other electrode connected to each one electrode of two transistors TMA and TMB.

The first operation control transistor TMA includes the gate electrode input with the first operation control signal MA, one electrode connected to the other electrode of the compensation capacitor CTH, and the other electrode connected to both one electrode of the first switching transistor TSA and one electrode of the storage capacitor CA.

The first switching transistor TSA includes the gate electrode input with the scan signal SA[i], one electrode connected to both the other electrode of the first operation control transistor TMA and the one electrode of the capacitor CA, and the other electrode connected to the data line dataj.

The second operation control transistor TMB includes the gate electrode input with the first operation control signal MB, one electrode connected to the other electrode of the compensation capacitor CTH, and the other electrode connected to both one electrode of the first switching transistor TSB and one electrode of the storage capacitor CB.

The second switching transistor TSB includes the gate electrode input with the scan signal SB[i], one electrode connected to both the other electrode of the second operation control transistor TMB and the one electrode of the storage capacitor CB, and the other electrode connected to the data line dataj.

The other electrode of the storage capacitor CA is connected to the voltage ELVDD, and the other electrode of the storage capacitor CB is connected to the voltage ELVDD.

The pixel shown in FIG. 5 includes the first path driving the driving transistor TD according to the data signal programmed to the storage capacitor CA, and the second path driving the driving transistor TD according to the data signal programmed to the storage capacitor CB.

The switch controlling a connection and a disconnection of the first path is the transistor MA, and the switch controlling the connection and the disconnection of the second path is the transistor MB. The transistor MA is controlled by the first operation control signal MA, and the transistor MB is controlled by the second operation control signal MB.

Figure 6:
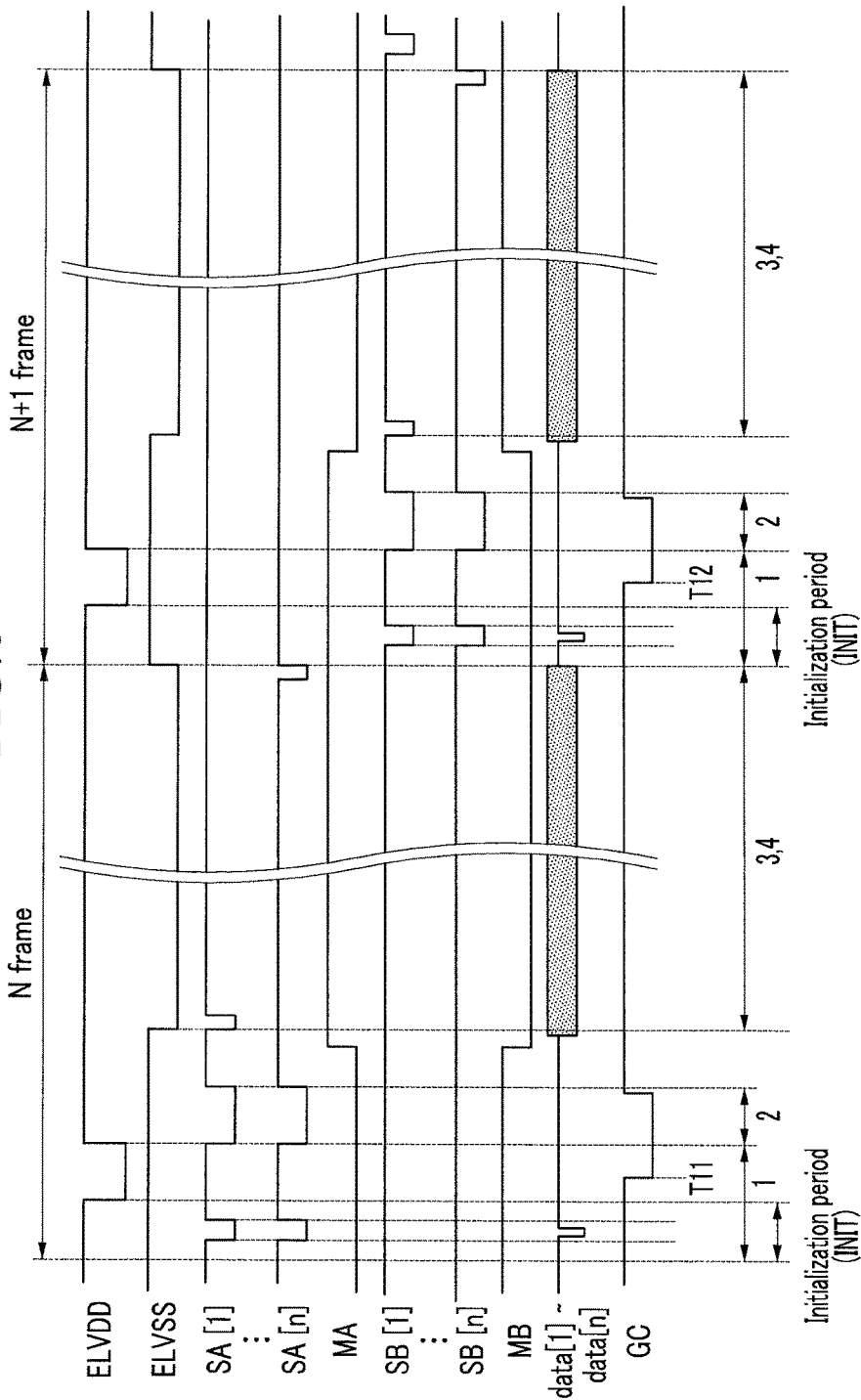
FIG. 6 is a view showing a driving waveform of a display device according to an exemplary embodiment of the present invention.

FIG. 6 is a view showing a driving waveform of a display device according to an exemplary embodiment of the present invention.

As shown in FIG. 6, the driving voltages ELVDD and ELVSS, the first scan signals SA[1]-SA[n], the second scan signals SB[1]-SB[n], the first operation control signal MA, the second operation control signal MB, the data signals data[1]-data[m], and the compensation control signal GC are changed according to the reset period 1, the compensation period 2, the scan period 3, and the light emitting period 4.

In FIG. 6, an initialization period INIT is further included before the reset period 1 of each frame. The reset period according to an exemplary embodiment of the present invention further includes the initialization period. The initialization operation may be omitted according to the characteristics of the display panel.

During the period in which the first scan signals SA[1]-SA[n] are at the enable ENABLE level among the initialization period INIT, the data signals data[1]-data[m] are changed into the reference voltage for initializing the node ND. The first switching transistor TSA is the P-channel type such that the enable ENABLE level of the first scan signals SA[1]-SA[n] is the low level.

The level of the reference voltage is set as a level to improve the response waveform of the organic light emitting diode (OLED).

The response waveform of the organic light emitting diode (OLED) is affected by a hysteresis characteristic of the driving transistor TD supplying the driving current to the organic light emitting diode (OLED). For example, in the characteristic curve between the drain current and the gate-source voltage of the driving transistor, a difference between the drain current of the direction that the gate-source voltage is increased and the drain current of the direction that the gate-source voltage is decreased, is generated. This phenomenon is the hysteresis characteristic of the driving transistor.

For the same data signal, if the current flowing to the organic light emitting diode (OLED) when the organic light emitting diode (OLED) is changed from high luminance to low luminance, and the current flowing to the organic light emitting diode (OLED) when the organic light emitting diode (OLED) is changed from low luminance to high luminance are different, then a motion blur is generated. This means that the response waveform of the organic light emitting diode (OLED) is affected in a case of receiving influence by the hysteresis characteristic.

The initialization period is to eliminate the hysteresis characteristic by initializing the voltage of the gate electrode of the driving transistor.

The transistors in an exemplary embodiment of the present invention are all the P-channel type such that the enable level is the low level capable of fully turning on the transistor of the P-channel type. In contrast, the disable level is the high level capable of fully turning off the transistor of the P-channel type.

In an exemplary embodiment of the present invention, the reference voltage is set up as the voltage of the low level, however it may be changed according to the channel type of the driving transistor. That is, when the driving transistor is the N-channel type, the reference voltage may be set up as the voltage of the high level.

In the initialization period INIT, during the period in which the first scan signal SA[1]-SA[n] is the enable level and the first operation control signal MA is the enable level, the first switching transistor TSA and the first operation control transistor TMA are turned on such that the data signals data[1]-data[m] are transmitted to the node ND. Here, the data signals data[1]-data[m] are the reference voltage of the low level such that the voltage of the node ND is decreased and the gate voltage of the driving transistor TD is decreased.

The voltage of the node ND of each of all pixels is decreased to the reference voltage at the initialization period INIT such that the gate voltage of the driving transistor TD of each of all pixels is decreased by the decreasing voltage of the node ND to become the low voltage at the low level, and thereby the driving transistor TD is turned on. At this time, the driving voltage ELVSS is the high level such that the current does not flow to the organic light emitting diode (OLED) and the light is not emitted.

If the driving voltage ELVDD becomes the low level in the reset period 1, the anode voltage of the organic light emitting diode (OLED) is reset to the driving voltage (ELVDD) level through the driving transistor TD of the on state. In the reset period 1, the first scan signals SA[1]-SA[n] are the disable level such that the first switching transistor TSA is in the turned off state.

If the compensation control signal GC becomes the low level at the time point T11 among the reset period 1, the compensation transistor TGC is turned on, and thereby the gate electrode of the driving transistor TD and the anode of the organic light emitting diode (OLED) are connected.

If the driving voltage ELVDD becomes the high level in the compensation period 2, the gate electrode and the drain electrode of the driving transistor TD are connected by the compensation transistor TGC of the on state. That is, the driving transistor TD is diode-connected. Thus, the current flows through the diode-connected driving transistor TD. At this time, the driving voltage ELVSS is the high level such that the current does not flow to the organic light emitting diode (OLED) and the light is not emitted.

In the compensation period 2, the first scan signals SA[1]-SA[n] are all at the low level and the first switching transistor TSA is turned on, and thereby the data signals data[1]-data[m] are transmitted to the node ND. The voltage of the data signals data[1]-data[m] of the compensation period 2 is referred to as an assistance voltage VSUS. In an exemplary embodiment of the present invention, the assistance voltage VSUS is set up as 10V, and the driving voltage ELVDD is set up as 12V in the compensation period 2, however the present invention is not limited thereto.

The voltage of the node NG is ELVDD+VTH (the threshold voltage of the driving transistor TD) by the diode-connected driving transistor TD, and the voltage of the node ND is VSUS such that the voltage ELVDD+VTH−VSUS is stored to the compensation capacitor CTH.

If the compensation control signal GC becomes the high level, then the compensation transistor TGC is turned off, and the voltage of the node ND and the node NG is maintained by the capacitor CA and the compensation capacitor CTH that is connected to the compensation capacitor CTH in series.

The scan period 3 and the light emitting period 4 concurrently or simultaneously progress after the compensation period 2. The driving current following to the data signal programmed to the pixel PX during the scan period of the previous frame (the (N−1)-th frame, not shown) of the N-th frame is generated such that the organic light emitting diode (OLED) emits the light. The data signals data[1]-data[m] transmitted to a plurality of pixels PX during the scan period of the (N−1)-th frame is stored to the capacitor CB.

A plurality of data signals data[1]-data[m] are sequentially transmitted to a plurality of pixels PX during the N-th frame scan period 3. The data signal data[1]-data[m] programmed at the N-th frame is stored to the capacitor CA.

After the compensation period 2 is finished, the driving voltage ELVSS is decreased from the high level 10V to the low level 0V, the first operation control signal MA is changed from the low level to the high level, and the second operation control signal MB is changed from the high level to the low level. The first operation control signal MA and the second operation control signal MB are inverse, and the levels of the two operation control signals MA and MB are changed every frame at the scan period 3 and the light emitting period 4.

During the scan period 3 and light emitting period 4, the light emitting is operated by the operation control signal turning on either the first operation control transistor TMA or the second operation control transistor TMB, and the scan operation is executed by the operation control signal turning off either the first operation control transistor TMA or the second operation control transistor TMB.

In FIG. 6, as an example, during the scan period 3 and the light emitting period 4 of the N-th frame, the first operation control signal MA is at the high level turning off the first operation control transistor TMA such that the scan operation in which the data signal data[1]-data[m] of the N-th frame is programmed to the storage capacitor CA is executed. Also, the second operation control signal MB is at the low level turning on the second operation control transistor TMB such that the driving transistor TD controls the driving current according to the data signal stored to the storage capacitor CB, and the light emitting operation in which the organic light emitting diode (OLED) emits the light by the driving current is executed.

Firstly, the light emitting operation of the N-th frame is described. The second operation control signal MB is the low level such that the second operation control transistor TMB is turned on, and then the node ND is connected to the storage capacitor CB. The storage capacitor CB is stored with the data signal of the previous (N−1)-th frame.

The data signal stored to the storage capacitor CB is applied to the node ND by the turn-on of the second operation control transistor TMB. The parasitic capacitor CP of the driving transistor TD (not shown) and the compensation capacitor CTH are connected in series such that the capacitor of the driving transistor for the node ND is the capacitor CX(CTH*CP/(CTH+CP)) of which the compensation capacitor CTH and the parasitic capacitor CP are connected in series.

The capacitor CX and the capacitor CB are connected in the light emitting period 4 in series, and the voltage VDT of the node ND by the charge sharing of two capacitors is as in the following Equation 1.

$$VDT = a * V\text{data} \qquad \text{Equation 1}$$

Here, a is equal to CB/CB+CX. Capacitances of the capacitor CB and the capacitor CX are represented by "CB" and "CX", respectively. The Vdata is equal to the voltage stored to the capacitor CB according to the data signal of the previous (N−1)-th frame.

The voltage stored to the capacitor CB is changed according to the charge sharing of two capacitors, and the node ND is changed to the voltage VDT. The node ND and the gate electrode NG are coupled by the capacitor CTH, and the voltage of the gate electrode NG is also changed to the voltage ELVDD+VTH−VSUS+VDT according to the voltage change VDT−VSUS of the node ND.

The driving current IOLED supplied to the organic light emitting diode (OLED) through the driving transistor VD during the light emitting period 4 is as in the following Equation 2.

$$IOLED=k(VGS-VTH)^2=k((ELVDD+VTH-VSUS+VDT)-ELVDD-VTH)^2=k(VDT-VSUS)^2 \qquad \text{Equation 2}$$

Here, k is equal to a constant determined according to an inherent parameter of the driving transistor TD.

As shown in Equation 2, the driving current IOLED is not influenced by the threshold voltage of the driving transistor and the driving voltage ELVDD. Accordingly, the driving current is not influenced by the threshold voltage deviation between the driving transistors and the voltage drop IR-DROP generated in the wire supplying the driving voltage, and is determined according to the data signal.

Next, the scan period 3 is described.

The capacitor CA blocked with the node ND by the first operation control signal MA is programmed with the data signal of the N-th frame during the scan period 3. The voltage of the node ND of the light emitting period 4 of the next (N−1)-th frame is determined according to the voltage stored to the capacitor CA during the scan period 3, and the voltage of the gate electrode NG of the driving transistor TD is determined.

A plurality of first scan signals SA[1]-SA[m] become the pulse signals of the low level that is sequentially the enable level during the scan period 3. Thus, the first switching transistor TSA of a plurality of pixels connected to the scan line supplied with the first scan signals SA[1]-SA[m] of the low level pulse is turned on, and the corresponding data signal among a plurality of data signals data[1]-data[m] is stored to the capacitor CA through the turned-on first switching transistor TSA.

As described above, the N-th frame is finished, and the next (N+1)-th frame is started. During the initialization period INIT, the reset period 1, and the compensation period 2 of the (N−1)-th frame, the second operation control transistor TMB is in the turn-on state, and the first operation control transistor TMA is in the turn-off state.

As shown in FIG. 6, during the light emitting period 4 of the N-th frame, and the initialization period INIT, the reset period INIT, and the compensation period INIT of the (N+1)-th frame, the second operation control signal MB is at the low level of the enable level, and the first operation control signal MA is at the high level of the disable level.

As the signals alternately having the enable level and the disable level, the first operation control signal MA and the second operation control signal MB are operated at the same frequency, and have a phase difference of one frame.

The initialization period INIT and the compensation period 2 of the (N+1)-th frame are executed through the second operation control transistor TMB differently from the N-th frame. Also, the second operation control signal MB is at the disable level and the scan operation is executed to the capacitor CB during the scan period 3 of the (N−1)-th frame. Also, the first operation control signal MA becomes the enable level during the light emitting period 4 of the (N−1)-th frame, and a plurality of pixels PX emit the light according to a plurality of data signals programmed during the scan period 3 of the N-th frame.

In the initialization period INIT, since the first scan signals SB[1]-SB[n] are the enable level and the second operation control signal MB is the enable level, the second switching transistor TSB and the second operation control transistor TMB are turned on such that the data signals data[1]-data[m] are transmitted to the node ND. Here, the data signals data[1]-data[m] are the reference voltage of the low level such that the voltage of the node ND is initialized to the reference voltage and the gate voltage of the driving transistor TD is decreased.

The voltage of the node ND of each of all pixels is decreased to the reference voltage at the initialization period INIT such that the gate voltage of the driving transistor TD of each of all pixels is decreased by the decreasing voltage of the node ND to become the low voltage at the low level. The driving voltage ELVSS is the high level such that the current does not flow to the organic light emitting diode (OLED), and the light is not emitted.

If the driving voltage ELVDD is at the low level in the reset period 1, the anode voltage of the organic light emitting diode (OLED) is reset to the driving voltage ELVDD level through the on state of the driving transistor TD. The first scan signals SB[1]-SB[n] are the disable level in the reset period 1 such that the second switching transistor TSB is in the turn-off state.

If the compensation control signal GC is at the low level at the time point T12 of the reset period 1, the compensation transistor TGC is turned on such that the gate electrode of the driving transistor TD is connected to the anode of the organic light emitting diode (OLED).

If the driving voltage ELVDD is at the high level in the compensation period 2, the driving transistor TD is diode-connected. Thus, the current flows through the diode-connected driving transistor TD. Here, the driving voltage ELVSS is at the high level such that the current does not flow to the organic light emitting diode (OLED) and the light is not emitted.

In the compensation period 2, the first scan signals SB[1]-SB[n] are all at the low level and the second switching transistor TSB is turned on such that the data signals data[1]-data[m] are transmitted to the node ND. The data signals data[1]-data[m] of the compensation period 2 are at the assistance voltage VSUS. The voltage of the node NG is ELVDD+VTH by the diode-connected driving transistor TD, and the voltage of the node ND is the assistance voltage VSUS such that the voltage ELVDD+VTH−VSUS is stored to the compensation capacitor CTH.

The scan period 3 and the light emitting period 4 are currently or simultaneously processed after the compensation period 2. The driving current following the data signal programmed to the pixel PX during the scan period 3 of the previous N-th frame of the (N−1)-th frame is generated such that the organic light emitting diode (OLED) emits the light and a plurality of data signals data[1]-data[m] of the (N+1)-th frame are sequentially programmed to a plurality of pixels PX. The data signals data[1]-data[m] transmitted at the (N−1)-th frame are stored to the capacitor CB.

After the compensation period 2 is finished, the driving voltage ELVSS is decreased from the high level 10V to the low level 0V, the second operation control signal MB is changed from the low level to the high level, and the first operation control signal MA is changed from the high level to the low level.

During the scan period 3 and the light emitting period 4 of the (N+1)-th frame, the second operation control signal MB is at the high level turning off the second operation control transistor TMB such that the scan operation in which the data signals data[1]-data[m] of the (N−1)-th frame are programmed to the storage capacitor CB is executed. Also, the first operation control signal MA is at the low level turning on the first operation control transistor TMA such that the driving transistor TD controls the driving current according to the data signal stored to the storage capacitor CA, and the light emitting operation in which the organic light emitting diode (OLED) emits the light by the driving current is executed.

Firstly, the light emitting operation of the (N+1)-th frame is described. The first operation control signal MA is the low level such that the first operation control transistor TMA is turned on and the node ND is connected to the storage capacitor CA. The storage capacitor CA is stored with the data signal of the previous N-th frame.

The data signal stored to the storage capacitor CA is applied to the node ND by the turn-on of the first operation control transistor TMA. Like the above Equation 1, the voltage VDT of the node ND is equal to a*Vdata. Here, a is equal to CB/CB+CX, and Vdata is the voltage stored to the capacitor CA according to the data signal of the previous N-th frame. Also, the voltage of the gate electrode NG is changed to the voltage ELVDD+VTH−VSUS+VDT according to the voltage change VDT−VSUS of the node ND. The driving current IOLED supplied to the organic light emitting diode OLED through the driving transistor VD during the light emitting period 4 may be represented as Equation 2.

Next, the scan period 3 is described.

The capacitor CB blocked from the node ND by the second operation control signal MB is programmed with the data signal of the (N−1)-th frame during the scan period 3. A plurality of second scan signals SB[1]-SB[m] sequentially become the low level pulse signal of the enable level during the scan period 3. Thus, the second switching transistor TSB of each of a plurality of pixels connected to the scan line supplied with the second scan signals SB[1]-SB[m] of the low level pulse is turned on, and the corresponding data signal of a plurality of data signals data[1]-data[m] is stored to the capacitor CB through the turned-on second switching transistor TSB.

This operation is repeated, and thereby the scan period 3 and the light emitting period 4 are concurrently or simultaneously executed.

The concurrent or simultaneous light emitting driving method according to an exemplary embodiment of the present invention is further appropriate to display a stereoscopic image compared with a conventional art.

Figure 7:
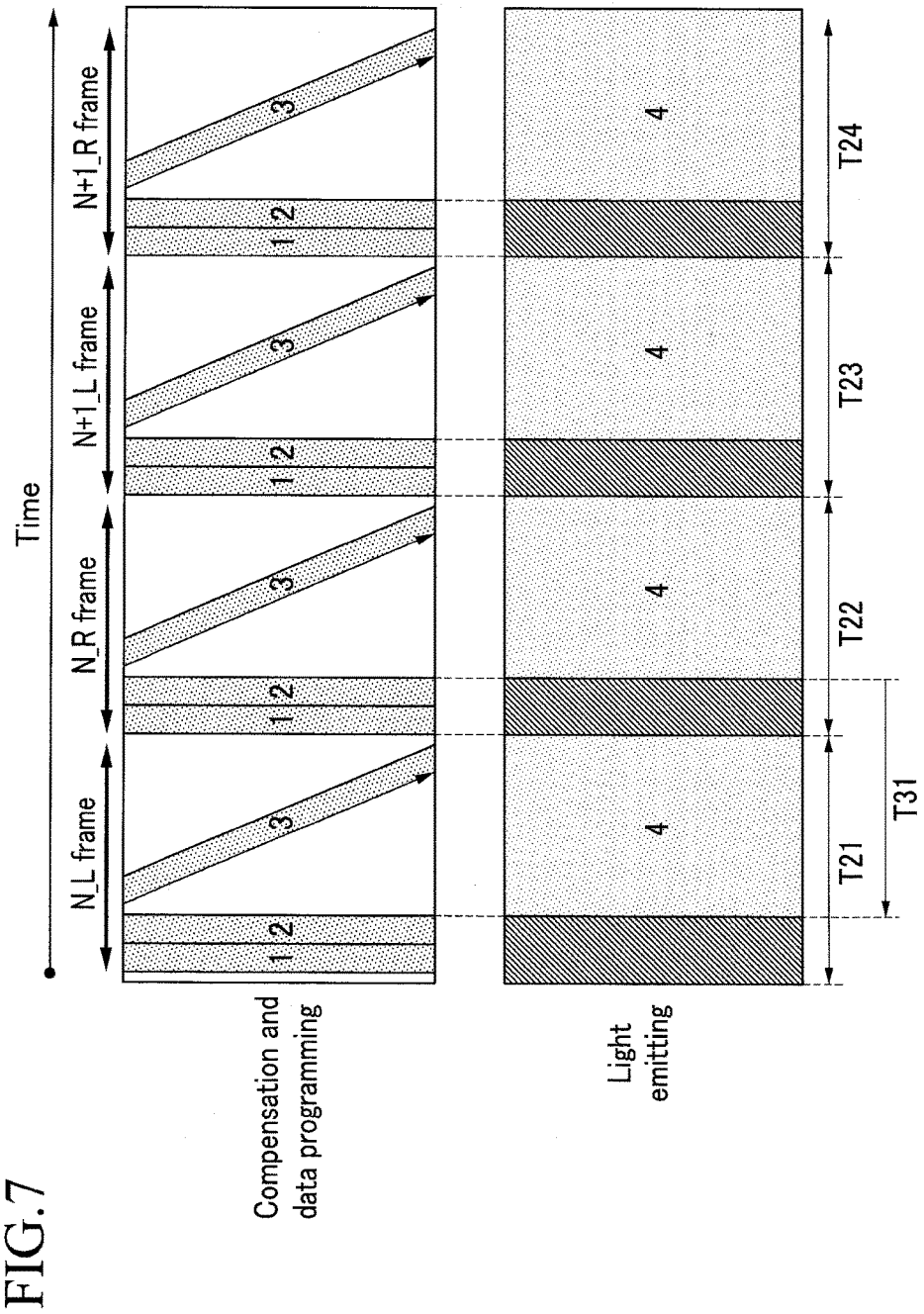
FIG. 7 is a view of a case when a stereoscopic image is displayed according to a simultaneous light emitting driving method according to an exemplary embodiment of the present invention.

FIG. 7 shows a case that a stereoscopic image is displayed according to a concurrent or simultaneous light emitting driving method according to an exemplary embodiment of the present invention.

The display device displays a left-eye image and a right-eye image to realize the stereoscopic image. There is a method using shutter glasses among methods of displaying the left-eye image and the right-eye image. The left eye lens of the shutter glasses is opened during a period that the left-eye image is displayed and the right eye lens is closed during this period. The right eye lens of the shutter glasses is opened during the period that the right-eye image is displayed and the left eye lens is closed during this period.

FIG. 7 shows a method that the display device displays the left-eye image and the right-eye image according to the shutter glasses method. As shown in FIG. 7, each frame includes the reset period 1, the compensation period 2, the scan period 3, and the light emitting period 4.

In FIG. 7, the frame in which a plurality of data signals (hereinafter referred to as left eye image data signals) representing the left-eye image are respectively programmed to a plurality of pixels is indicated by a reference numeral "L", and the frame in which a plurality of data signals (hereinafter referred to as right eye image data signals) representing the right-eye image are respectively programmed to a plurality of pixels is indicated by a reference numeral "R".

The waveform of the driving voltage, the scan signal, the compensation control signal, and the operation control signal of the reset period 1, the compensation period 2, the scan period 3, and the light emitting period 4 is the same as the waveform shown in FIG. 6. The description for each period is omitted.

The left eye image data signal of the N_L frame is transmitted to a plurality of pixels during the scan period 3 of the period T21. During the scan period 3, the left eye image data signals corresponding to the plurality of pixels PX are programmed. At this time, a plurality of pixels emit the light according to the right eye image data signals programmed at the scan period 3 of the N−1_R frame during the light emitting period 4 of the period T21.

The right eye image data signal of the N_R frame is transmitted to a plurality of pixels at the scan period 3 of the period T22.

The right eye image data signal respectively corresponding to the plurality of pixels PX is programmed during the scan period 3. At this time, a plurality of pixels emit the light according to the left eye image data signal programmed at the scan period 3 of the N_L frame during the light emitting period 4 of the period T22.

The left eye image data signal of the N+1_L frame is transmitted to a plurality of pixels at the scan period 3 of the period T23. The eye image data signal respectively corresponding to a plurality of pixels PX is programmed during the scan period 3. At this time, a plurality of pixels emit the light according to the right eye image data signal programmed at the scan period 3 of the N_R frame during the light emitting period 4 of the period T23.

The right eye image data signal of the N+1_R frame is transmitted to a plurality of pixels at the scan period 3 of the period T24. The right eye image data signal respectively corresponding to a plurality of pixels PX is programmed during the scan period 3. Here, a plurality of pixels emit the light according to the left eye image data signal programmed in the scan period 3 of the N+1_L frame during the light emitting period 4 of the period T24.

By this method, the light due to the right-eye image is concurrently or simultaneously emitted during the period that the left-eye image is programmed, and the light due to the left-eye image is concurrently or simultaneously emitted during the period that the right-eye image is programmed. Thus, a sufficient light emitting period may be obtained, and thereby the image quality of the stereoscopic image is improved.

The scan period 3 and the light emitting period 4 are included in the same period such that the interval T31 between the light emitting period 4 of each frame may be set up regardless of the scan period. Here, the interval between the light emitting period 4 may be set up as an interval that is desired in consideration of the response speed of the liquid crystal of the shutter glasses.

In a conventional case in which the scan period 3 and the light emitting period 4 are not included in the same period, the light emitting period 4 is disposed after the scan period 3 such that the temporal margin at which the light emitting period 4 may be set up among the period of one frame is small. According to an exemplary embodiment of the present invention, the light emitting period 4 may be set up in the period except for the reset period and the compensation period among the period of one frame, or in the period except for the initialization period, reset period, and compensation period of one frame. Accordingly, the temporal margin that is capable of setting up the light emitting period 4 is increased compared with the conventional case, and thereby the interval between the light emitting periods 4 may be set up when considering the liquid crystal response speed of the shutter glasses.

For example, the interval T31 between the light emitting periods 4 may be set up when considering the time that the right eye lens (or the left eye lens) of the shutter glasses is completely opened from the view point that the light emitting of the left-eye image (or the right-eye image) is finished.

Next, various pixel structures applied with the concurrent or simultaneous light emitting method according to an exemplary embodiment of the present invention will be described with reference to FIGS. 8 and 9.

Figure 8:
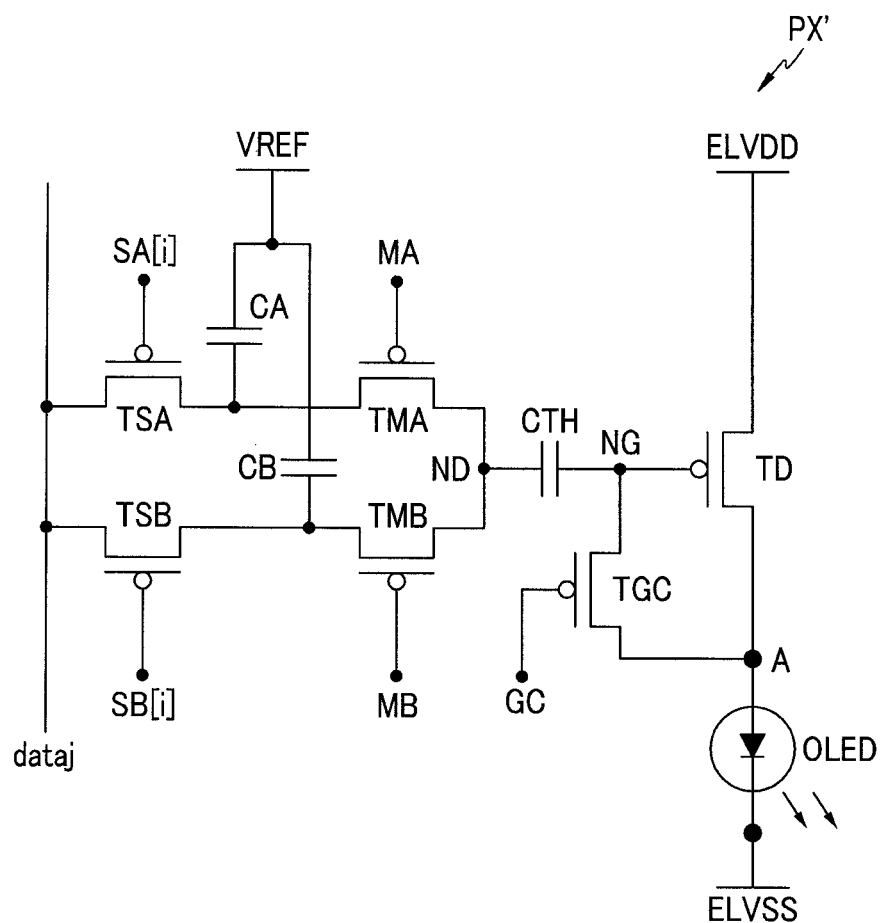
FIG. 8 is a view of another pixel structure according to an exemplary embodiment of the present invention.

FIG. 8 is a view of another pixel structure according to an exemplary embodiment of the present invention.

A pixel PX' shown in FIG. 8 further includes a reference voltage compared with the pixel PX shown in FIG. 5. The storage capacitor CA and the storage capacitor CB are connected to the reference voltage VREF instead of the driving voltage ELVDD.

The scan period 3 and the light emitting period 4 are concurrently or simultaneously generated such that the voltage drop IR-DROP of the driving voltage ELVDD may be influenced by the data writing of the scan period 3 during the light emitting period 4.

For example, during the period that the data signal data[j] is programmed to the pixel PX' such that the voltage according to the data signal data[j] is stored to the storage capacitor CA, if the driving voltage ELVDD is decreased to the voltage drop, the voltage stored to the storage capacitor CA is decreased. To prevent this, the reference voltage VREF that is different from the driving voltage ELVDD may be used.

The storage capacitor CA includes one electrode connected to both the first switching transistor TSA and the first operation control transistor TMB, and the other electrode connected to the reference voltage VREF.

The storage capacitor CB includes one electrode connected to both the second switching transistor TSB and the second operation control transistor TMB, and the other electrode connected to the reference voltage VREF.

Figure 9:
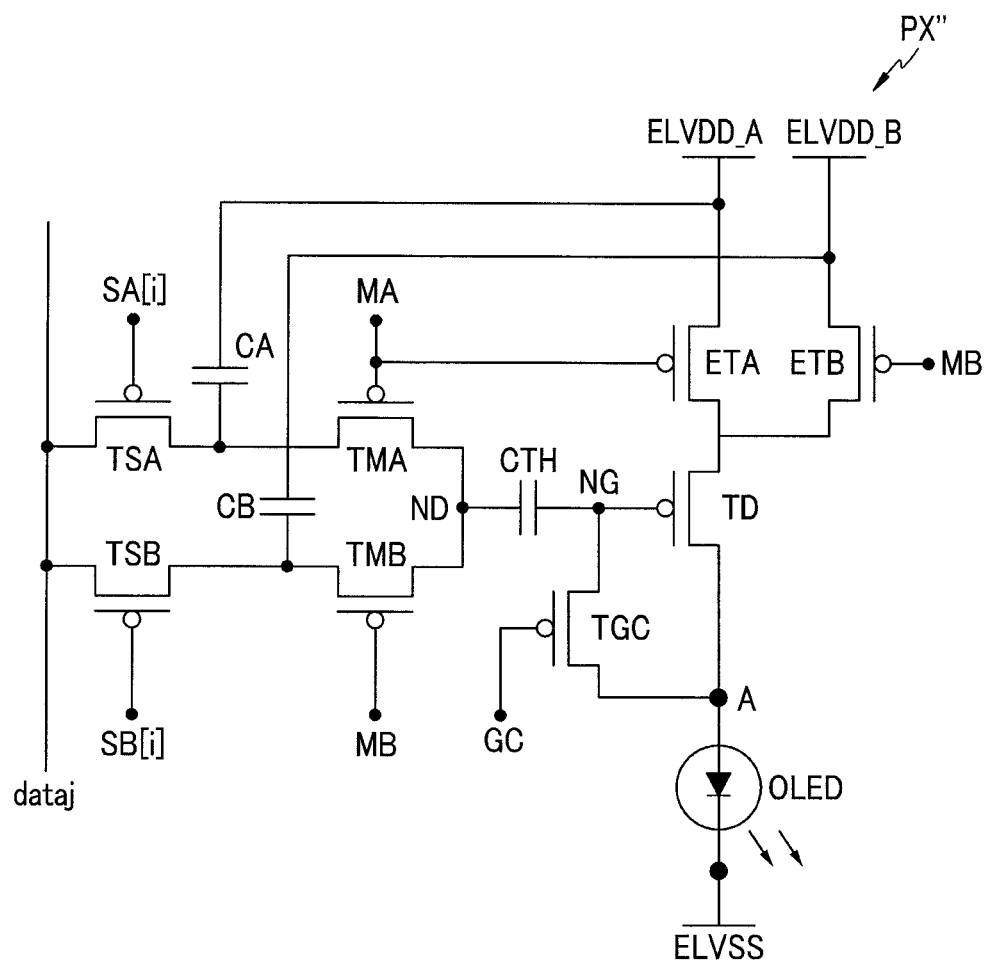
FIG. 9 is a view of another pixel structure according to an exemplary embodiment of the present invention.

FIG. 9 is a view of another pixel structure according to an exemplary embodiment of the present invention.

Compared with the pixel PX shown in FIG. 5, in the pixel PX" shown in FIG. 9, the storage capacitor CA and the storage capacitor CB are respectively connected to the driving voltage ELVDD_A and the driving voltage ELVDD_B, and the driving transistor TD is alternately connected to the driving voltage ELVDD_A and the driving voltage ELVDD_B through the first light emitting transistor ETA and the second light emitting transistor ETB. The driving voltage ELVDD_A and the driving voltage ELVDD_B are the voltages having the same waveform.

The storage capacitor CA includes one electrode connected to both the first switching transistor TSA and the first operation control transistor TMA, and the other electrode connected to the driving voltage ELVDD_A. The storage capacitor CB includes one electrode connected to both the second switching transistor TSB and the second operation control transistor TMB, and the other electrode connected to the driving voltage ELVDD_B.

The first light emitting transistor ETA is connected between the driving voltage ELVDD_A and the driving transistor TD, and the on/off thereof is controlled by the first operation control signal MA. The first light emitting transistor ETA includes the gate electrode input with the first operation control signal MA, the source electrode connected to the driving voltage ELVDD_A, and the drain electrode connected to the source electrode of the driving transistor TD.

The second light emitting transistor ETB is connected between the driving voltage ELVDD_B and the driving transistor TD, and the on/off thereof is controlled by the second operation control signal MB. The second light emitting transistor ETB includes the gate electrode input with the second operation control signal MB, the source electrode connected to the driving voltage ELVDD_B, and the drain electrode connected to the source electrode of the drain driving transistor TD.

If the first light emitting transistor ETA is turned on by the first operation control signal MA, then the driving transistor TD is connected to the driving voltage ELVDD_A. Here, the driving transistor TD generates the driving current according to the voltage difference between the driving voltage ELVDD_A and the gate electrode during the light emitting period 4.

If the second light emitting transistor ETB is turned on by the second operation control signal MB, then the driving transistor TD is connected to the driving voltage ELVDD_B. Here, the driving transistor TD generates the driving current according to the voltage difference between the driving voltage ELVDD_B and the gate electrode during the light emitting period 4.

As described above, using two driving voltages ELVDD_A and ELVDD_B obtains the same effect as using the reference voltage VREF. That is, the driving voltage connected to the driving transistor TD and the driving voltage connected to the capacitor to which the data writing is executed among the capacitor CA and the capacitor CB, are different from each other during the period that the organic light emitting diode (OLED) emits the light.

For example, during the period that the driving transistor TD is connected to the driving voltage ELVDD_B and the driving current is supplied to the organic light emitting diode (OLED), the voltage according to the data signal is stored to the capacitor CA. Here, the driving voltage ELVDD_A is connected to the capacitor CA. As described above, the driving voltage for the light emitting operation and the driving voltage for the data writing operation are divided such that the voltage drop IR-drop by the light emitting is not generated among the data writing operation, thereby obtaining luminance uniformity of the screen.

Figure 10:
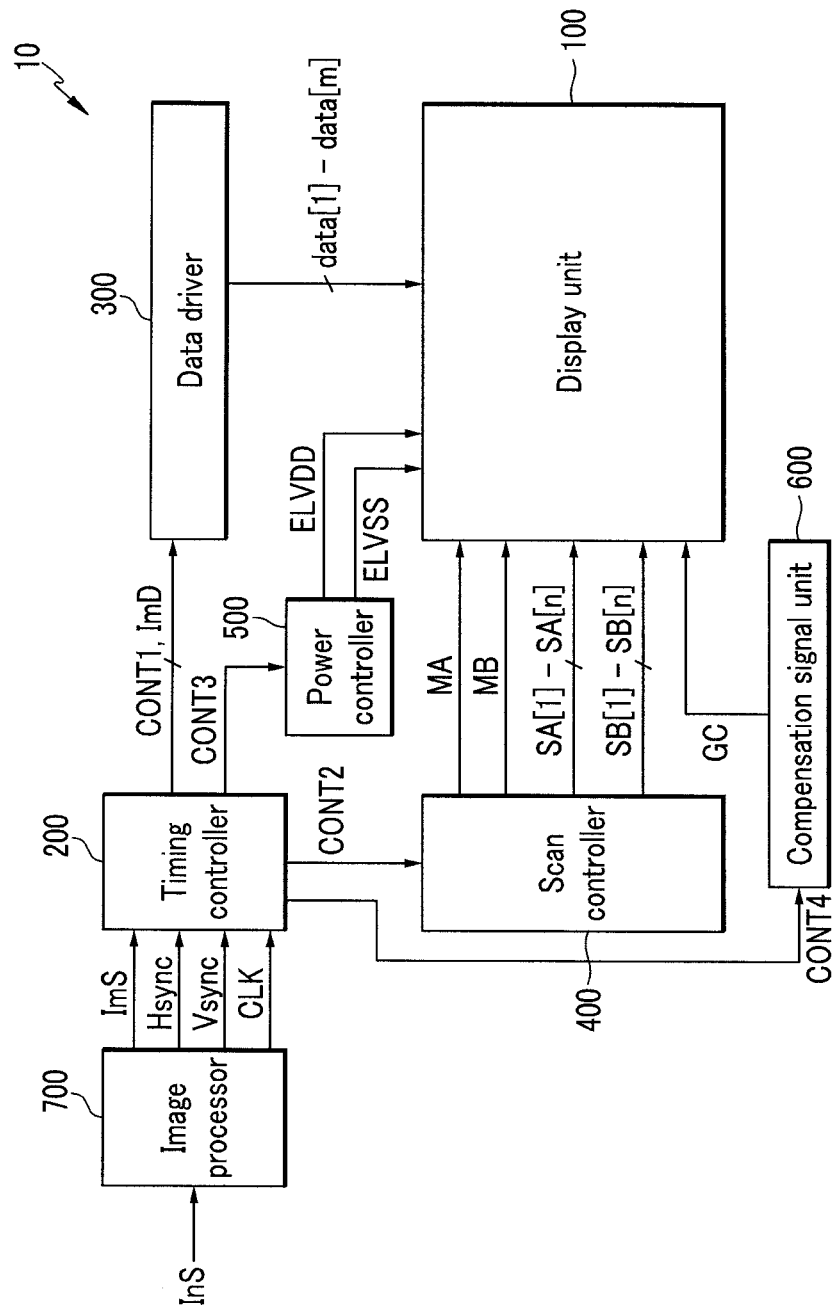
FIG. 10 is a view of a display device according to an exemplary embodiment of the present invention.

Next, a constitution of a display device according to an exemplary embodiment of the present invention will be described with reference to FIG. 10. FIG. 10 is a view of a display device according to an exemplary embodiment of the present invention.

As shown in FIG. 10, the display device 10 includes an image processing unit 700, a timing controller 200, a data driver 300, a scan driver 400, a power source controller 500, a compensation control signal unit 600, and a display unit 100.

The image processing unit 700 generates a video signal ImS and a synchronization signal from an input signal InS. The synchronization signal includes a horizontal synchronization signal Hsync, a vertical synchronization signal Vsync, and a main clock signal CLK.

The image processing unit 700 divides the left-eye image signal representing the left eye picture and the right eye video signal representing the right eye picture as the frame unit when the signal (hereinafter, image source signal) representing the image included in the input signal InS is the signal representing the stereoscopic image. The image processing unit 700 arranges the left-eye image signal and the right eye image signal according to the vertical synchronization and the horizontal synchronization to generate the video signal ImS.

When the image source signal is the signal representing the plane image, the image processing unit 700 divides the image source signal as the frame unit and arranges the image source signal according to the vertical synchronization and the horizontal synchronization to generate the video signal ImS.

The main clock signal CLK may be a clock signal having a basic frequency included in the image source signal, or may be one of clock signals appropriately generated according to the necessity of the image processing unit 700.

The timing controller 200 generates first to fourth driving control signals CONT1-CONT4 and the image data signal ImD according to the video signal ImS, the vertical synchronization signal Vsync, the horizontal synchronization signal Hsync, and the main clock signal CLK.

The timing controller 200 divides the video signal ImS as the frame unit according to the vertical synchronization signal Vsync and divides the video signal ImS as the scan line unit according to the horizontal synchronization signal Hsync to generate the image data signal ImD and transmit it to the data driver 300 along with the first driving control signal CONT1.

The data driver 300 samples and holds the image data signal ImD input according to the first driving control signal CONT1, and respectively transmits a plurality of data signals data[1]-data[m] to a plurality of data lines.

The scan driver 400 generates a plurality of first scan signals SA[1]-SA[n], a plurality of second scan signals SB[1]-SB[n], the first operation control signal MA, and the second operation control signal MB according to the second driving control signal CONT2, and transmits them to the corresponding scan line during the initialization period INIT, the reset period 1, the compensation period 2, the scan period 3, and the light emitting period 4 of each frame.

The power source controller 500 determines the level of the driving voltages ELVDD and ELVSS during the initialization period INIT, the reset period 1, the compensation period 2, the scan period 3, and the light emitting period 4 according to the third driving control signal CONT3, and supplies them to the power line. When applying the pixel structure according to FIG. 9, two driving voltages ELVDD_A and ELVDD_B are generated from the power source controller 500 and are supplied to the display unit 100.

The compensation control signal unit 600 determines the level of the compensation control signal GC during the initialization period INIT, the reset period 1, the compensation period 2, the scan period 3, and the light emitting period 4 according to the fourth driving control signal CONT4 and supplies them to the control signal line.

The display unit 100 was described above with reference to FIG. 4.

In view of the foregoing, an embodiment of the present invention provides a display device including a pixel including an organic light emitting diode (OLED), a driving transistor connected to the driving voltage and supplying a driving current to the organic light emitting diode (OLED), a compensation capacitor connected to the gate electrode of the driving transistor, and a first storage capacitor and a second storage capacitor electrically connected to or blocked from the compensation capacitor, and a driving method thereof. In one embodiment, an anode voltage of the organic light emitting diode (OLED) is discharged to be reset, and a threshold voltage of the driving transistor is stored to the compensation capacitor. The data voltage is stored to the first storage capacitor according to the corresponding data signal, and the organic light emitting diode (OLED) emits light according to the driving current flowing to the driving transistor by the data voltage stored to the second storage capacitor. Here, the organic light emitting diode (OLED) of each of a plurality of pixels emits the light by the corresponding driving current during the same light emitting period. In addition, a step that the data voltage is stored and a step that the organic light emitting diode (OLED) emits the light are temporally overlapped.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS reset period 1, compensation period 2, scan period 3, light emitting period 4
first scan lines SA1-SAn, second scan lines SB1-SBn
data lines data1-datam, first voltage line 701, second voltage line 702
compensation control line 703, first operation control line 704, second operation control line 705
driving transistor TD, first switching transistor TSA
second switching transistor TSB, first operation control transistor TMA
second operation control transistor TMB, compensation transistor TGC
storage capacitor CA, CB, compensation capacitor CTH, organic light emitting diode OLED
driving voltage ELVDD, ELVSS, ELVDD_A, ELVDD_B, pixel PX, PX', PX"
image processing unit 700, timing controller 200, data driver 300
scan driver 400, power source controller 500, compensation control signal unit 600, display unit 100.

What is claimed is:

1. A driving method of a display device including a plurality of pixels, each including an organic light emitting diode (OLED), a driving transistor connected to a driving voltage and supplying a driving current to the OLED, a compensation capacitor connected to a gate electrode of the driving transistor, a first storage capacitor, and a second storage capacitor, wherein the compensation capacitor includes one electrode directly connected to the gate electrode of the driving transistor and another electrode directly connected to a first operation control transistor and electrically connected to or disconnected from the first storage capacitor through the first operation control transistor, the method comprising:
   a reset step in which an anode voltage of the OLED is discharged;
   a compensation step in which a threshold voltage of the driving transistor is stored to the compensation capacitor;
   a scan step in which a data voltage is stored to the first storage capacitor according to a corresponding data signal; and a light emitting step in which the OLED emits light according to the driving current flowing to the driving transistor by a data voltage stored to the second storage capacitor, wherein the light emitting steps of the plurality of pixels are concurrently generated, and the scan step and the light emitting step are temporally overlapped, and wherein a voltage supplied to the first storage capacitor in the scan step is different from a voltage supplied to the driving transistor in the light emitting step.

2. The driving method of claim 1, wherein
the scan step includes
a step in which the connection of the first storage capacitor and the compensation capacitor is blocked, and the first storage capacitor is transmitted with the corresponding data signal.

3. The driving method of claim 1, wherein
the light emitting step includes
a step in which the second storage capacitor and the compensation capacitor are connected, and the voltage of the gate electrode of the driving transistor is changed by the data voltage stored in the second storage capacitor.

4. The driving method of claim 1, wherein
the reset step includes
a step in which the driving transistor is turned on such that an anode of the OLED is connected to the driving voltage, and a different driving voltage input to a cathode of the OLED is higher than the driving voltage.

5. The driving method of claim 1, wherein
the compensation step includes
a step in which the first storage capacitor is connected to the compensation capacitor, a set voltage is input to a node to which the first storage capacitor and the compensation capacitor are connected, and the driving transistor is diode-connected.

6. The driving method of claim 1, wherein
the reset step includes
a step in which the first storage capacitor and the compensation capacitor are connected, a set reference voltage is transmitted to a node at which the first storage capacitor and the compensation capacitor are connected, and the voltage of the gate electrode of the driving transistor is initialized by the reference voltage.

7. The driving method of claim 1, wherein
the display device further includes another driving voltage connected to a cathode of the OLED, and
a voltage level of the another driving voltage during the reset step and the compensation step is different than that during the light emitting step.

8. A driving method of a display device including a plurality of pixels, each including a driving transistor, a first storage capacitor, and a second storage capacitor, and a compensation capacitor, the compensation capacitor including one electrode directly connected to a gate electrode of the driving transistor and another electrode directly connected to a first operation control transistor and a second operation control transistor and electrically connected to one of the first and second storage capacitors through the first operation control transistor and the second operation control transistor, the method comprising:

programming first frame data to the first storage capacitor of each of the plurality of pixels during a first scan period;

programming second frame data to the second storage capacitor of each of the plurality of pixels during a second scan period; and emitting light through the plurality of pixels by a driving current flowing in the driving transistor of each of the plurality of pixels according to the first frame data programmed to the first storage capacitor during a first light emitting period, wherein the second scan period and the first light emitting period are temporally overlapped, and wherein a voltage supplied to the first storage capacitor in the first scan period is different from a voltage supplied to the driving transistor in the first light emitting step.

9. The driving method of claim 8, further comprising
programming third frame data preceding the first frame data to the second storage capacitor of each of the plurality of pixels; and emitting light through the plurality of pixels by a driving current flowing in the driving transistor of each of the plurality of pixels according to the third frame data programmed to the second storage capacitor of each of the plurality of pixels during a second light emitting period, and the second light emitting period and the first scan period are temporally overlapped.

10. The driving method of claim 8, wherein
the first frame data is first view point data, and the second frame data is second view point data different from the first view point data.

11. A pixel comprising:
an organic light emitting diode (OLED);
a driving transistor configured to be electrically connected to a first driving voltage and to supply a driving current to the OLED;
a compensation capacitor configured to store a threshold voltage of the driving transistor;
a first operation control transistor including one electrode directly connected to another electrode of the compensation capacitor and configured to be controlled by a first operation control signal;
a second operation control transistor including one electrode directly connected to the other electrode of the compensation capacitor and configured to be controlled by a second operation control signal;
a first storage capacitor including one electrode connected to another electrode of the first operation control transistor and another electrode connected to a set reference voltage different from the first driving voltage; and
a second storage capacitor including one electrode connected to another electrode of the second operation control transistor and another electrode connected to the reference voltage,
wherein the compensation capacitor includes one electrode directly connected to a gate electrode of the driving transistor and another electrode selectively connected to the first and second storage capacitors, and
wherein the second operation control transistor is configured such that when it is turned on, the second storage capacitor and the compensation capacitor are connected during a period in which the first operation control transistor is turned off such that a data voltage is stored to the first storage capacitor according to a corresponding data signal.

12. The pixel of claim 11, further comprising:
a first switching transistor including one electrode connected to the one electrode of the first storage capacitor, and another electrode configured to be input with the corresponding data signal and to be controlled by a first scan signal; and a second switching transistor including one electrode connected to the one electrode of the second storage capacitor, and another electrode configured to be input with the corresponding data signal and to be controlled by a second scan signal.

13. The pixel of claim 12, further comprising
a compensation transistor connected between the gate electrode and a drain electrode of the driving transistor.

14. The pixel of claim 13, wherein
the first switching transistor is configured to be turned on and the compensation transistor is configured to be turned on during a compensation period.

15. The pixel of claim 11, wherein
the pixel further includes
a source of a fourth driving voltage applied to a cathode of the organic light emitting diode (OLED), and
the driving transistor is turned on during a reset period and the first driving voltage has a lower level than the fourth driving voltage.

16. A display device comprising:
a plurality of data lines for transmitting a plurality of data signals;
a plurality of first scan lines for transmitting a plurality of first scan signals;
a plurality of second scan lines for transmitting a plurality of second scan signals;
a first operation control line and a second operation control line for transmitting a first operation control signal and a second operation control signal;
a first voltage line for transmitting a first driving voltage and a second voltage line for transmitting a second driving voltage; and
a plurality of pixels each connected to a corresponding data line of the data lines, a corresponding first scan line of the first scan lines, a corresponding second scan line of the second scan lines, the first operation control line, the second operation control line, the first voltage line, and the second voltage line,
wherein each of the pixels includes:
an organic light emitting diode (OLED) including a cathode connected to the second voltage line;
a driving transistor connected to the first voltage line for supplying a driving current to the OLED;
a compensation capacitor connected to a gate electrode of the driving transistor; and
a first storage capacitor and a second storage capacitor connected between the compensation capacitor and a source of the first driving voltage, and
wherein the display device is configured to provide:
a first period in which the first storage capacitor is connected to the corresponding data line according to both a first scan signal of the first scan signals transmitted through the corresponding first scan line and the first operation control signal transmitted through the first operation control line, and the compensation capacitor is blocked; and
a second period temporally overlapped with the first period and in which the second storage capacitor is blocked from the corresponding data line and is connected to the compensation capacitor according to both a second scan signal of the second scan signals transmitted through the corresponding second scan line and the second operation control signal transmitted through the second operation control line, and
wherein a voltage supplied to the first storage capacitor in the first period is different from a voltage supplied to the driving transistor in the second period.

17. The display device of claim 16, wherein
the display device further includes a compensation control line for transmitting a compensation signal, and
each of the pixels further includes a compensation transistor connected between the gate electrode and a drain electrode of the driving transistor and operated according to the compensation signal.

18. The display device of claim 17, wherein
during a reset period in which the compensation transistor is turned on and the first driving voltage transmitted through the first voltage line is at a first level, the display device is configured to provide the second driving voltage with a voltage level transmitted through the second voltage line that is different from the level of the second driving voltage during the first period and the second period.

19. The display device of claim 18, wherein
the first driving voltage is at a second level different from the first level during the first period and the second period.

* * * * *